No. 751,637. PATENTED FEB. 9, 1904.
E. HANCOX.
APPARATUS FOR UPSETTING PIPE ENDS.
APPLICATION FILED DEC. 2, 1901.
NO MODEL. 4 SHEETS—SHEET 1.
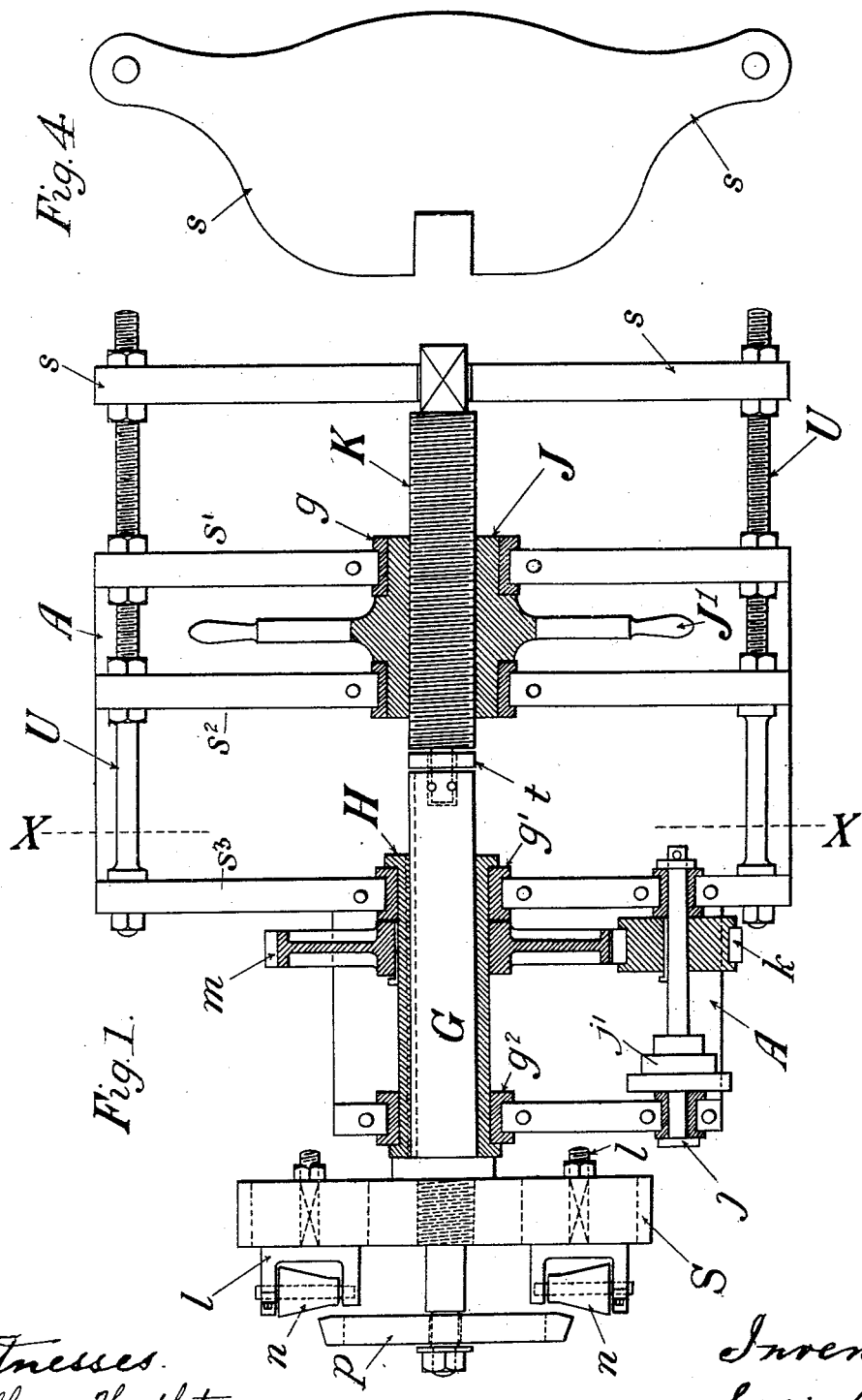
Witnesses.
William Hadlet.
Jonathan Slee
Inventor.
Edwin Hancox.

No. 751,637. PATENTED FEB. 9, 1904.
E. HANCOX.
APPARATUS FOR UPSETTING PIPE ENDS.
APPLICATION FILED DEC. 2, 1901.
NO MODEL. 4 SHEETS—SHEET 2.
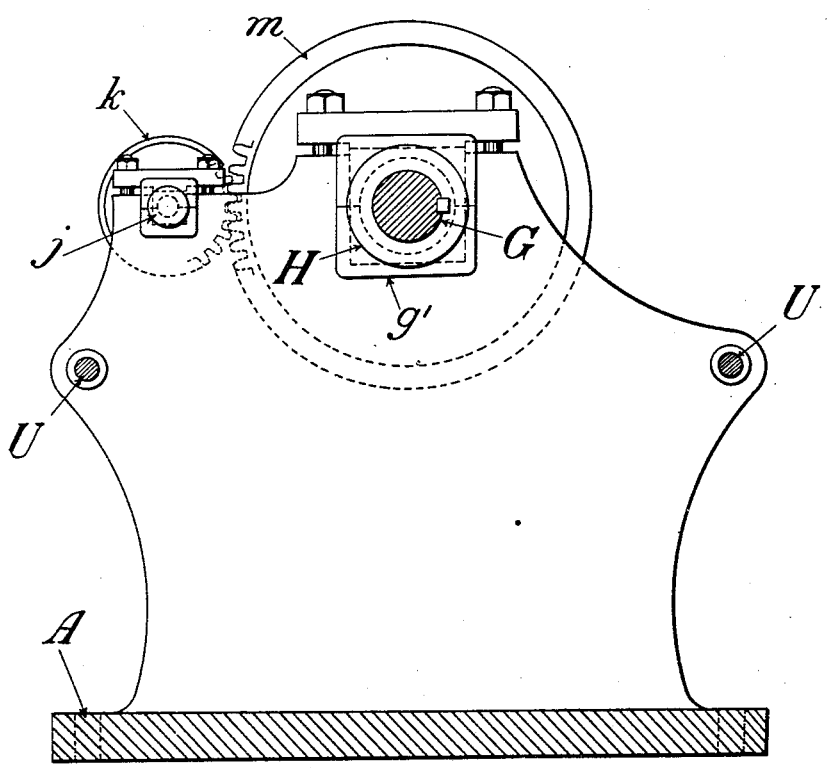

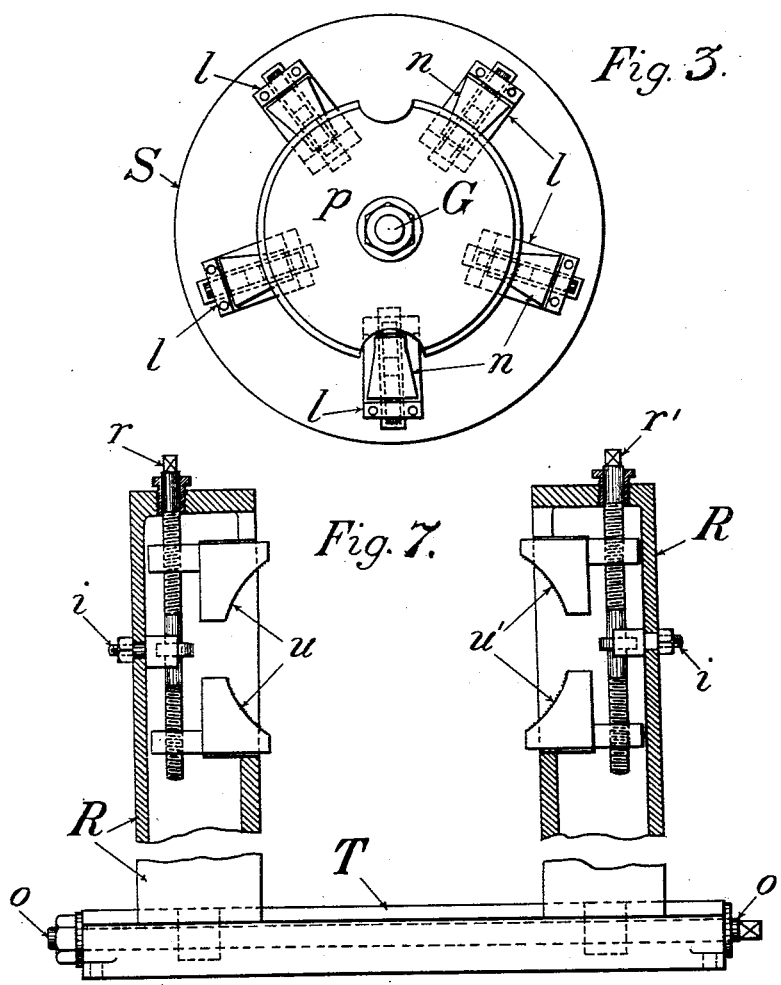

No. 751,637. PATENTED FEB. 9, 1904.
E. HANCOX.
APPARATUS FOR UPSETTING PIPE ENDS.
APPLICATION FILED DEC. 2, 1901.
NO MODEL. 4 SHEETS—SHEET 4.
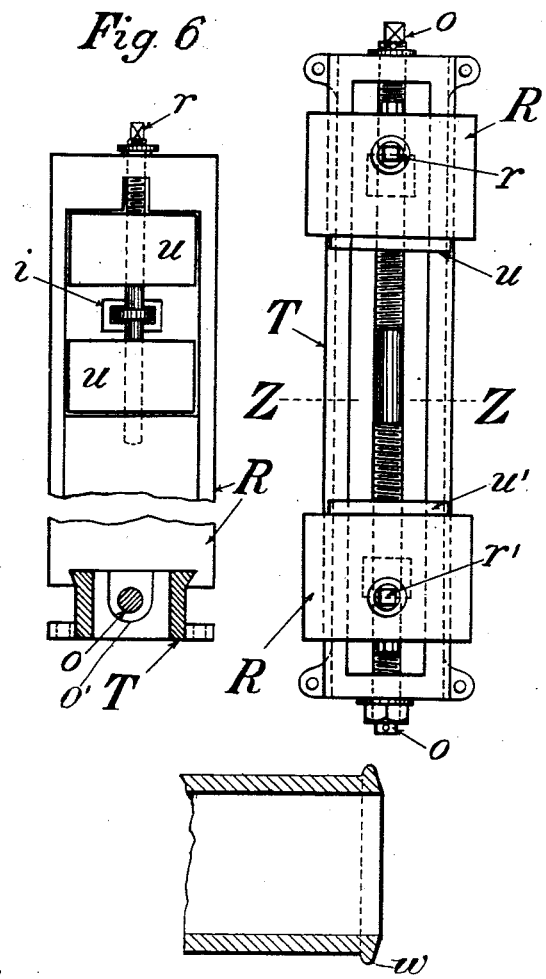
Witnesses.
William Hadlet.
Jonathan Slee
Inventor.
Edwin Hancox.

No. 751,637. Patented February 9, 1904.

UNITED STATES PATENT OFFICE.

EDWIN HANCOX, OF STOCKTON-ON-TEES, ENGLAND.

APPARATUS FOR UPSETTING PIPE ENDS.

SPECIFICATION forming part of Letters Patent No. 751,637, dated February 9, 1904.

Application filed December 2, 1901. Serial No. 84,461. (No model.)

*To all whom it may concern:*

Be it known that I, EDWIN HANCOX, a subject of the King of Great Britain, residing at Stockton-on-Tees, county of Durham, England, have invented certain new and useful Improvements in Apparatus for Upsetting Pipe Ends, of which the following is a specification, reference being had to the drawings accompanying and forming part of the same.

My invention relates to machines for upsetting the ends of metal pipes to prepare them for receiving a ring or other device for securing together the abutting ends of adjacent pipes to form a satisfactory joint.

The invention consists of the novel features and combinations hereinafter described, and more particularly pointed out in the claims.

Referring now to the drawings, Figure 1 is a plan view, partly in section, of a convenient embodiment of my invention, showing the upsetting machinery. Fig. 2 is a section on line X X of Fig. 1. Fig. 3 is an end elevation of the revolving head which carries the upsetting-rollers and the stationary mandrel. Fig. 4 is a detail view of one of the end frames of the machine. Fig. 5 is a plan view of the mechanism for holding the pipe during the upsetting operation. Fig. 6 is a section on line Z Z, Fig. 5. Fig. 7 is a side elevation, partly in section, of the same mechanism shown in Fig. 5. Fig. 8 shows in section a pipe end having an annular rib thereon.

A suitable frame, consisting of a base A and frame-plates $s\ s'\ s^2\ s^3$, connected by tie-bolts U, carries bearings $g\ g'\ g^2$. In the bearings $g'\ g^2$ is mounted a sleeve H, to which is secured a spur-gear $m$, driven by a pinion $k$, keyed on the shaft $j$, which latter carries also one or more belt-pulleys $j''$ for connection with a source of power. Slidably mounted in the sleeve and revolving therewith is a shaft G, which carries the head or disk S, whereon are mounted in bearings or brackets $l$ the upsetting or ribbing rollers $n$, adapted to bear on the outer edge of the pipe end, as by reason of their conical form and inward inclination. On an extension of the shaft G is the mandrel $p$, loosely secured, so as not to rotate with the shaft. In the rear bearings $g$ is an interiorly-screw-threaded sleeve J, through which extends the screw-shaft K. The latter does not rotate with the shaft G, but is so connected thereto that the reciprocation of said shaft K by turning the sleeve J by means of the hand-wheel J' will advance or retract the shaft G in the sleeve H. Binding of the contiguous ends of the shafts is prevented by the small collar $t$ between the same.

When the apparatus is to be operated, there is arranged in front of the head S a pipe-holding mechanism—such as is shown, for example, in Figs. 5, 6, and 7. This consists of uprights R R, adapted to be moved toward or from each other on a bed-plate T by means of the screw $o$, which traverses lugs $o'$, depending from the uprights.

$u\ u'$ are grippers or jaws, the members of each set being adjustable toward or from each other vertically on the uprights R R by means of the screws $r\ r'$. The latter are prevented from reciprocation by the clutches $i\ i$, which receive collars on the screws.

The pipe to be operated upon is placed with one end in the jaws $u\ u'$, which are tightened to clamp the pipe securely by turning up the screws $r, r'$, and $o$, the pipe first being adjusted so that its end is central with and close to the mandrel $p$. By rotating the sleeve J the shafts K and G are moved forward, forcing the mandrel into the pipe and bringing the upsetting-rollers $n\ n$ into contact with the pipe end. The head S is then rotated by the power devices before described, and the pressure of the rollers $n\ n$ on the pipe end being kept up by the screw devices J, J', and K a flange or annular rib is formed thereby, as shown at $w$, Fig. 8. The mandrel $p$, which is not rotated with the shaft G, but is held stationary by the pipe, holds the latter true and prevents the pressure of the upsetting-rollers from distorting it. If it is desired to upset or flange the ends of the well-known "lock-bar" pipe, the mandrel should be provided with notches, as shown in Fig. 3, to receive the longitudinal locking-bars of the pipe.

The mechanism which I have here specifically shown and described is of course typical merely of my invention, which may obviously be embodied in widely-varying forms without departure from the proper scope thereof; but What I claim is—

1. In an apparatus for upsetting pipe ends, the combination with means for holding the pipe, of a shaft, a head or disk on the shaft carrying upsetting-rollers, means for rotating the shaft, means for moving the shaft in line of its axis whereby the rollers on the head or disk may be made to bear on the pipe end, and a mandrel on the shaft adapted to enter the pipe end to hold the same true and to prevent distortion by the rollers, as set forth.

2. In an apparatus for upsetting pipe ends, the combination with means for holding the pipe, of a shaft, a head or disk on the shaft carrying upsetting-rollers, means for rotating the shaft, means for moving the shaft longitudinally while rotating, and a non-rotating mandrel carried by said shaft and adapted to enter the pipe end, as set forth.

3. In an apparatus for upsetting pipe ends, the combination with means for holding the pipe, of a shaft composed of sections, a head or disk carrying upsetting devices on one of the sections, means for rotating the head or disk bearing section, means for moving the shaft in line of its axis whereby the upsetting devices on the head or disk may be made to bear on the pipe end, and a mandrel on the shaft adapted to enter the pipe end to hold the same true and to prevent distortion, as set forth.

4. In an apparatus for upsetting pipe ends, the combination with means for holding the pipe, of a shaft composed of two sections, a head or disk carrying upsetting devices on one of the sections, means for rotating the head or disk bearing section, a screw device on the other section for reciprocating the entire shaft in line of its axis, and a mandrel on the shaft adapted to enter the pipe end to hold the same true and to prevent distortion, as set forth.

5. In an apparatus for upsetting pipe ends, the combination with a shaft composed of sections, one of said sections carrying an upsetting head or disk, the other section being screw-threaded, of a relatively stationary screw-threaded sleeve on the last-named section, a bearing for the sleeve, and means for rotating the sleeve in its bearings, whereby the shaft may be reciprocated through the sleeve, as set forth.

In testimony whereof I have signed my name to this specification, in the presence of two subscribing witnesses, this 21st day of November, A. D. 1901.

EDWIN HANCOX.

Witnesses:
   T. W. MALKIN,
   JNO. S. SHORT.